United States Patent
Johri et al.

(10) Patent No.: US 10,112,598 B1
(45) Date of Patent: Oct. 30, 2018

(54) SYSTEM AND METHOD OF CONTROLLING ENGINE TORQUE OF HYBRID VEHICLE

(71) Applicant: Ford Global Technologies, LLC, Dearborn, MI (US)

(72) Inventors: Rajit Johri, Canton, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/711,248

(22) Filed: Sep. 21, 2017

(51) Int. Cl.
*B60W 20/14* (2016.01)
*B60W 10/02* (2006.01)
*B60W 20/30* (2016.01)

(52) U.S. Cl.
CPC .............. *B60W 20/14* (2016.01); *B60W 10/02* (2013.01); *B60W 20/30* (2013.01); *B60W 2510/0638* (2013.01); *B60W 2510/0657* (2013.01); *B60W 2510/083* (2013.01); *B60W 2540/10* (2013.01); *B60W 2550/12* (2013.01)

(58) Field of Classification Search
CPC ......... B60W 20/14; B60W 2510/0638; B60W 2540/10; B60W 2510/083; B60W 2550/12; B60W 20/30; B60W 10/02; B60W 2510/0657
See application file for complete search history.

(56) References Cited

U.S. PATENT DOCUMENTS

| | | | |
|---|---|---|---|
| 6,387,011 B1 * | 5/2002 | Bellinger | B60W 10/06 477/110 |
| 6,832,978 B2 * | 12/2004 | Buchanan | B60W 10/02 477/174 |
| 7,023,150 B2 | 4/2006 | Hisada et al. | |
| 8,448,731 B2 | 5/2013 | Heap et al. | |
| 8,583,306 B2 | 11/2013 | Arnett et al. | |
| 8,755,962 B2 | 6/2014 | Suzuki | |
| 8,864,624 B2 * | 10/2014 | Hoffmeister | B60W 10/02 477/70 |
| 9,656,666 B2 | 5/2017 | Wang et al. | |
| 2010/0261577 A1 * | 10/2010 | MacFarlane | F16D 48/06 477/84 |

* cited by examiner

*Primary Examiner* — David J Hlavka
(74) *Attorney, Agent, or Firm* — David B. Kelley; Brooks Kushman P.C.

(57) ABSTRACT

A vehicle includes an engine and a motor selectively coupled by a clutch. A controller of the vehicle is programmed to, responsive to driver-demanded torque exceeding a maximum torque of the motor and the clutch being locked, confine rates of output torque increase of the engine to a limit having a first value, and responsive to the driver-demanded torque being satisfied, reduce the limit to a second value.

20 Claims, 5 Drawing Sheets

SYSTEM AND METHOD OF CONTROLLING ENGINE TORQUE OF HYBRID VEHICLE

TECHNICAL FIELD

This disclosure relates to controlling engine torque of hybrid vehicles and more specifically to systems and methods for rate limiting increases in engine torque.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine. The hybrid powertrain is also capable of performing regenerative braking where the electric machine brakes the vehicle by converting mechanical power into electrical power to recharge the battery.

SUMMARY

According to one embodiment, a vehicle includes an engine and a motor selectively coupled by a clutch. A controller of the vehicle is programmed to, responsive to driver-demanded torque exceeding a maximum torque of the motor and the clutch being locked, confine rates of output torque increase of the engine to a limit having a first value, and responsive to the driver-demanded torque being satisfied, reduce the limit to a second value.

According to another embodiment, a vehicle includes a traction battery, an engine, a step-ratio gearbox including multiple discrete gear ratios, and a motor coupled to the gearbox with a torque converter. The motor is electrically connected to the traction battery. A disconnect clutch selectively couples the engine and the motor when locked. A controller is programmed to, responsive to driver-demanded torque exceeding a maximum torque of the motor, start the engine and command engagement of the disconnect clutch. The controller is further programmed to, responsive to the disconnect clutch being locked, command torque of the engine such that increases in the torque are rate limited according to a first rate of change until the driver-demanded torque is achieved, and then are rate limited according to a second rate of change that is less than the first rate.

According to yet another embodiment, a method of rate limiting engine torque is presented. The method is executed by a vehicle controller and includes, responsive to a clutch being locked to fix an engine to a motor and driver-demanded torque exceeding a maximum torque of the motor, confining rates of output torque increase of the engine to a limit having a first value, and responsive to the driver-demanded torque being satisfied, reducing the limit to a second value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
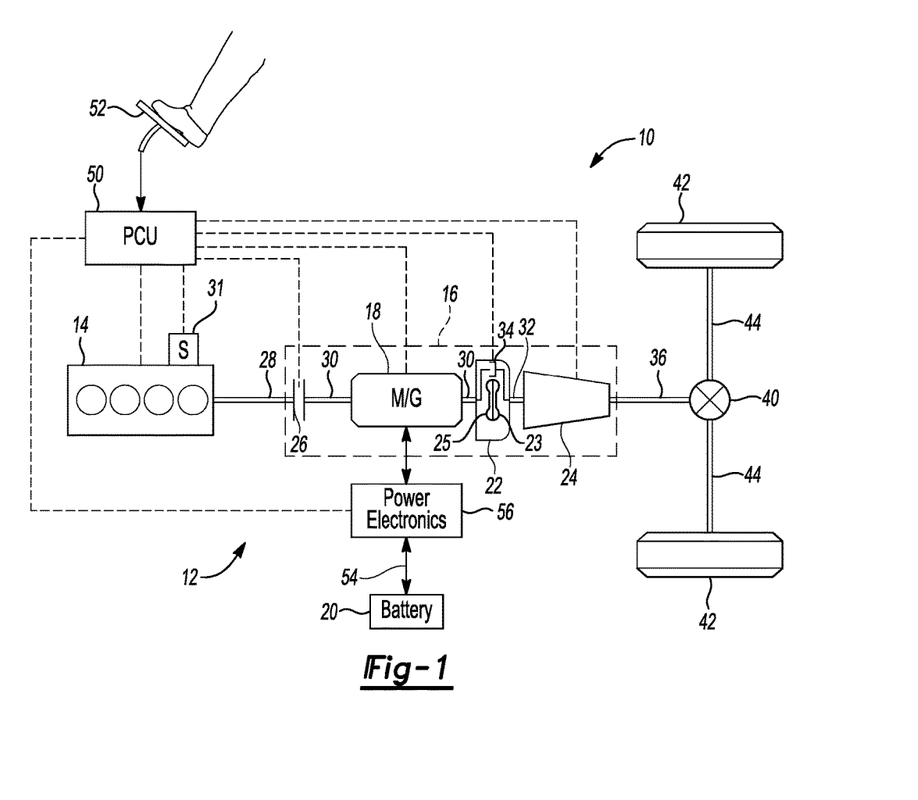
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, the transmission 16 includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline, diesel, or natural gas powered engine. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged. When the disconnect clutch 26 is locked (fully engaged), the crankshaft 28 is fixed to the shaft 30.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine 14 to the M/G 18 to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller 23 fixed to M/G shaft 30 and a turbine 23 fixed to a transmission input shaft 32. The torque converter 22 provides a hydraulic coupling between shaft 30 and transmission input shaft 32. The torque converter 22 transmits power from the impeller 23 to the turbine 25 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step drive ratios. For simplicity, the gear ratios may be referred to as gears, i.e., first gear, second gear, etc. The friction elements are controllable through a shift schedule that connects and disconnects certain elements of the gear sets to control the speed and torque ratios between a transmission output shaft 36 and the transmission input shaft 32.

The gearbox 24 may have six speeds including first through sixth gears. In this example, sixth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes one or more controller 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The hybrid powertrain 12 of vehicle 10 has multiple actuators, e.g. the engine and the motor, that may be used to produce a given driver-demanded torque. These actuators may be controlled by different control modules that each communicate with the VSC over a data bus, e.g., CAN. In one embodiment, the engine is controlled by the ECM and the motor is controlled by the MCU. The VSC may reside inside the ECM and communicates with the MCU over the CAN. Communication between the ECM and the MCU via the CAN may introduce a phase delay between information at the MCU and the ECM. Phase delays may cause one or more of the actuators to produce a torque that is different than the commanded torque for a short duration of time. This may lead to the final output torque at the driven wheels 42 being greater or less than the driver-demanded torque.

Figure 2:
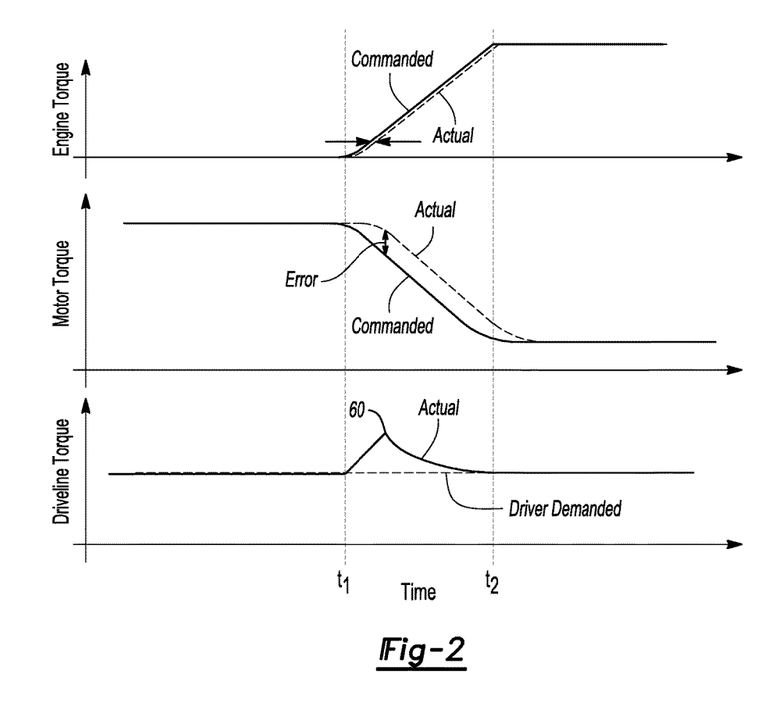
FIG. 2 is a plot illustrating engine torque, motor torque, and driver-demanded torque for an example engine-start scenario.

Referring to FIG. 2, a torque swap between the engine and the motor was commanded at time $T_1$ with the engine torque being increased and the motor torque being decreased. Torque swap refers to situations where the rate of change of torque for the motor and the engine are in opposite directions, e.g., engine increasing and motor decreasing, or vice versa. At time $T_1$, the controller begins commanding the engine to increase torque production and begins commanding the motor to decrease torque production. Ideally, the actuators would respond immediately, but, in practice, phase delays and other inefficiencies caused the actuators to produce actual torques that differed from the command torques. Phase delays between the motor and the engine caused the motor to produce an actual torque that was greater than the commanded torque. Thus, the combined torque actually produced by the actuators has a torque error (i.e., the difference between the driver-demanded torque and the actual torque) due to the phase error. This torque error caused a torque spike 60 at the input shaft of the gear box. The torque spike 60 propagated through the drivetrain and into the driven wheels creating a disturbance, which can be perceivable by the driver if the torque spike 60 has a large enough magnitude. Phase-delay induced torque spikes, such as torque spike 60, are particularly noticeable in situations where driver-demanded torque remains constant during the torque swap because the driver is not expecting an acceleration or deceleration of the vehicle.

The torque error is more pronounced when the motor torque is changing at a fast rate. The error $\Delta\tau_{err}$ in driveline torque estimation is bounded by equation 1, where $\Delta\tau_{mtr}$ is the change in motor torque if it changes instantaneously, $\partial t_{mtr}/\partial t$ is the rate of change of motor torque, and $t_{Delay}$ is a communication time delay between control modules.

$$\frac{\partial \tau_{mtr}}{\partial t} * t_{Delay} \leq \Delta\tau_{err} < \Delta\tau_{mtr} \quad \text{Eq. (1)}$$

As evidenced by equation 1, the effect of phase errors between the motor and the engine can be reduced by limiting the rate of change of torque of the motor and/or the engine. Referring back to FIG. 2, if the rate of change of the engine torque between times $T_1$ and $T_2$ had been confined to a rate less than the rate illustrated, then the torque spike 60 would have been less. Generally, the rate of change of torque and the torque spike are directly proportional, i.e., reducing the rate reduces the torque spike. But, confining the rate increases the amount of time it takes to complete the torque swap as the engine will approach the required torque more slowly. In some scenarios, such as FIG. 2, completion time for the torque swap is not all that critical because the driver-demanded torque is constant. But, in other scenarios—such as under hard acceleration where driver-demanded torque exceeds the maximum motor torque—timing is more critical as the vehicle will under deliver powertrain-output torque until the engine reaches the required torque, which produces sluggish acceleration. The maximum motor torque may be the physical limit of the electric machine or may be an artificial limit imposed by designers.

Figure 3:
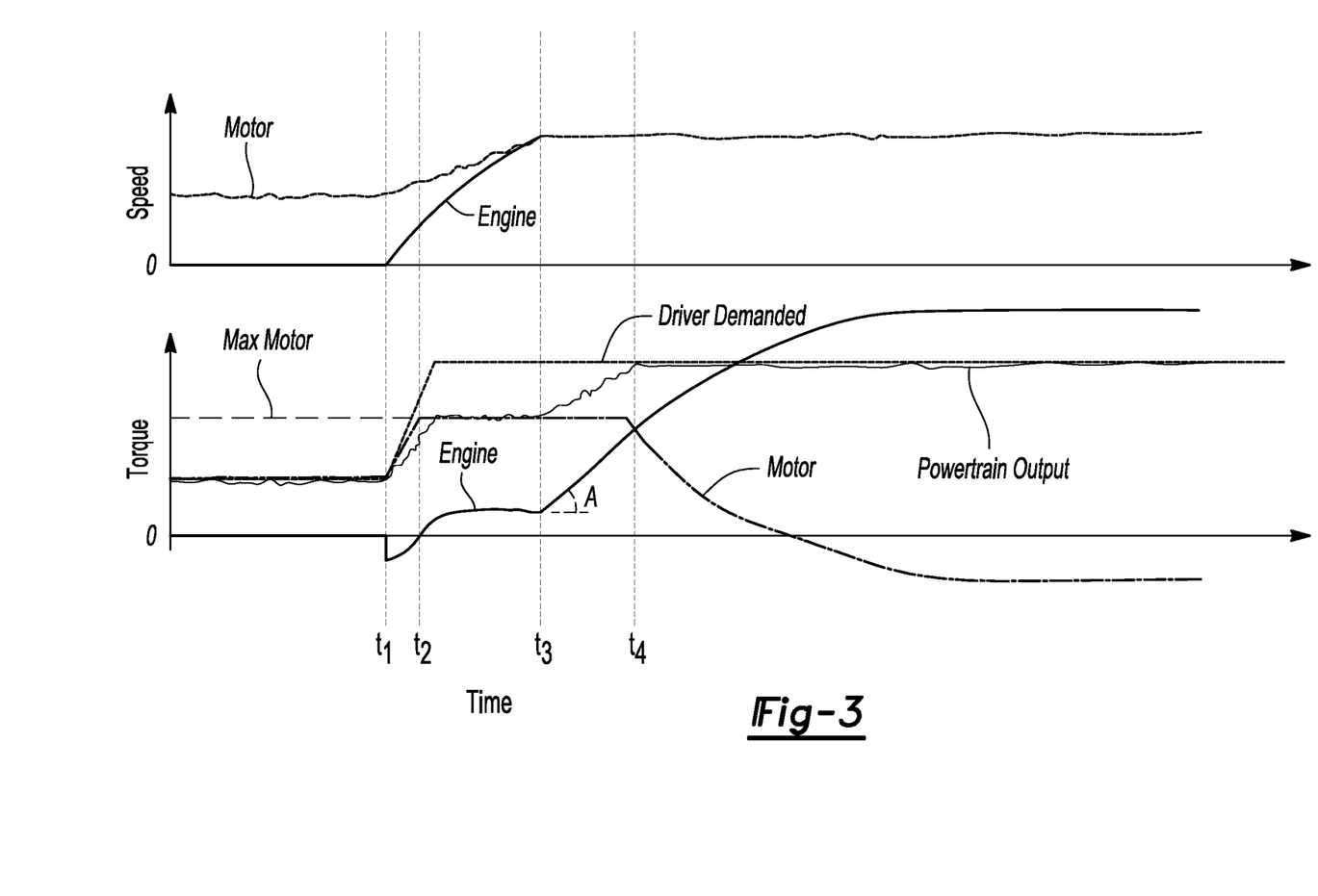
FIG. 3 is a plot illustrating engine torque, motor torque, and driver-demanded torque, and engine and motor speed for another example engine-start scenario in which increases in engine torque are rate limited according to a single rate.

FIG. 3 illustrates a scenario in which rate limiting (confining) the engine torque reduced the torque spike but also created delayed acceleration of the vehicle. Prior to time $T_1$, the vehicle is traveling in EV mode. At time $T_1$, the driver tips-in the accelerator pedal causing the driver-demanded torque to substantially increase above the maximum motor torque. This triggers an engine start as the engine will be required to supply the torque deficit between the driver-demanded torque and the maximum motor torque. In order to prevent a torque spike at the gearbox input shaft, the rate of change of the engine torque was limited to rate A between times $T_3$ and $T_4$. Limiting the rate of change of the engine torque to rate A increases the amount of time required to meet driver-demanded torque, which occurs at time $T_4$. The vehicle substantially under produces powertrain-output torque between times $T_2$ and $T_4$, which may be perceived as sluggish acceleration.

As explained above, phase-delay induced torque spikes can be generated during a torque swap between the engine and the motor. If a torque swap is not occurring, then phase delays do not present a torque spike issue and there is no need to rate limit the engine torque to a rate calculated to prevent torque spikes. Thus, the vehicle may be programmed to limit engine torque increases according to a first rate limit during torque-swap conditions and according to a second rate limit during other conditions, such as engine start in response to driver-demanded torque exceeding maximum motor torque.

Figure 4:
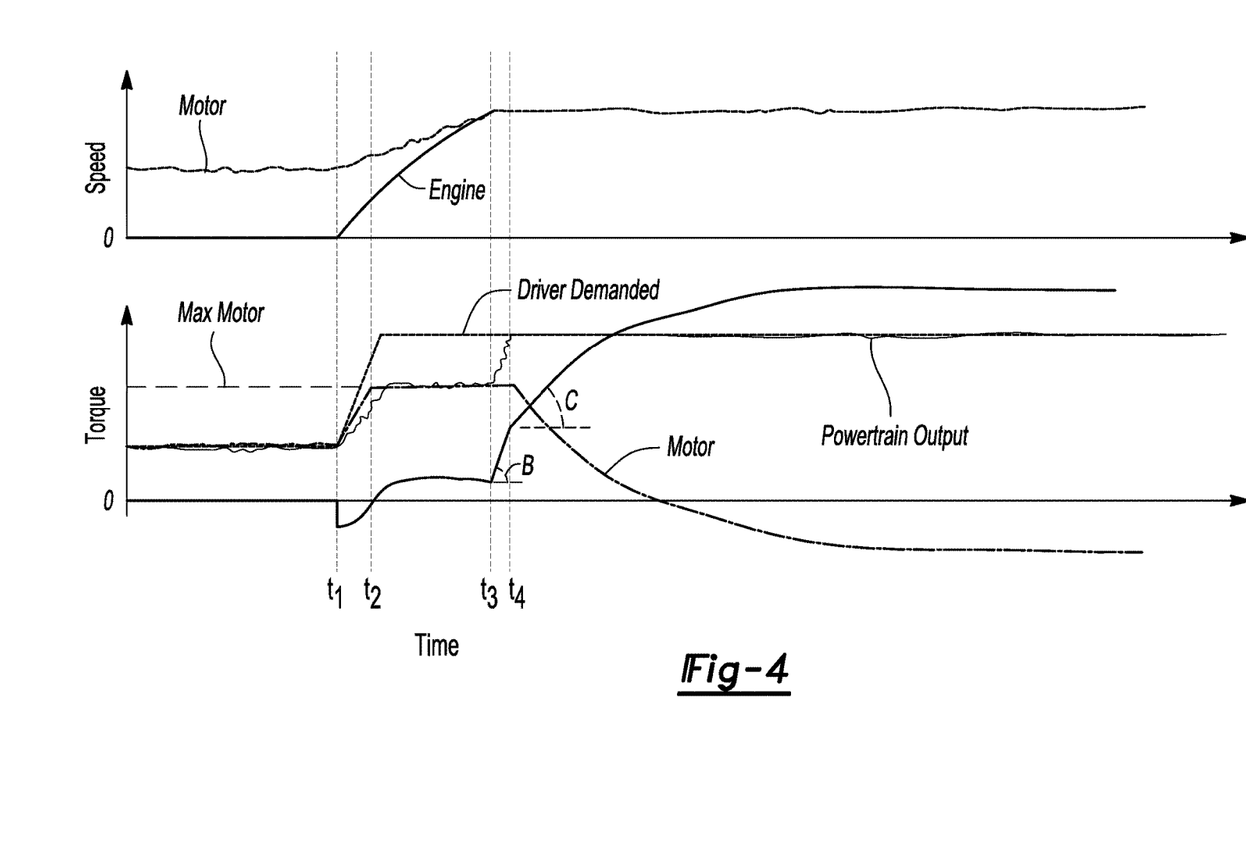
FIG. 4 is a plot illustrating engine torque, motor torque, and driver-demanded torque, and engine and motor speed for another example engine-start scenario in which increases in engine torque are rate limited according to a pair of rates.

By using a larger rate limit, during engine start in response to driver-demanded torque exceeding maximum motor torque and the disconnect clutch being closed, the driver-demanded torque can be met more quickly, which enhances the acceleration of the vehicle. Referring to FIG. 4, prior to time $T_1$, the vehicle is traveling in EV mode. At time $T_1$, the driver tips-in the accelerator pedal causing the driver-demanded torque to substantially increase above the maximum motor torque. This triggers an engine start as the engine will be required to supply the torque deficit between the driver-demanded torque and the maximum motor torque. The engine is started at time $T_1$ and is coupled to the transmission at time $T_3$ when the disconnect clutch locks. At time $T_3$, the engine torque is ramped up to meet the driver-demanded torque. Between times $T_3$ and $T_4$ the rates of engine torque increases are confined to a limit so that the rate of change of the engine torque during this period is limited to rate B. Rate B is set independently of torque spike as an actuator swap does not occur between times $T_3$ and $T_4$. Since torque spike is not an issue, rate B can be greater than rate A, which allows the driver-demanded torque to be met faster. Rate B may be constrained by driveline resonance frequency to prevent hardware damage of the powertrain.

In comparing the examples of FIG. 3 and FIG. 4, it can be seen that vehicle-acceleration delay between times $T_2$ and $T_4$ in FIG. 3 is much greater than the vehicle-acceleration delay between times $T_2$ and $T_4$ of FIG. 4. Once the driver-demanded torque is met, an actuator swap may occur and torque spike must be controlled. To accomplish this, the rate limit of engine torque switches from rate limit B to rate limit C at time $T_4$. Rate C is less than rate B and is calibrated to maintain torque spikes within an allowable tolerance.

The rate of change of the engine torque increase may be limited at different rates depending upon the driver-demanded torque and the maximum motor torque. In one embodiment, a pair of rate limits, e.g., rate limits B and C, are used during an engine start when driver-demanded torque exceeds the maximum motor torque limit, and a single rate limit, e.g., rate limit C, is used during an engine start when driver-demanded torque is less than the maximum motor torque limit. Rate limit C may also be used in conditions other than engine start.

Rate limit C may be based on the gear ratio of the gearbox, i.e., the magnitude of rate C changes depending upon the current gear ratio of the gearbox. This is because the torque spike occurs at the gearbox input shaft and is amplified by the gearbox and the final drive of the differential before propagating to the driven wheels. The amount of amplification varies by the gear ratio of the gearbox. For example, in a six-speed transmission, the torque spike is amplified the most when the transmission is the lowest gear (first gear) and is amplified the least of when in the highest gear (sixth gear). Thus, the rate of change of the engine must be limited to a lower rate in first gear than in sixth gear. The magnitude of rate C for each gear may be calibrated by determining an acceptable amount of torque spike at the driven wheels, which may be 200 to 600 newton meters. Once this is determined, the magnitude of the torque spike at the input shaft can be calculated for each gear ratio of the gearbox. The individual magnitudes for rate C in each gear can then be calibrated to ensure that the torque spike at the input shaft is within the allowable envelope. Alternatively, rate limit C may be static and have a magnitude that prevents excessive torque spike for all gear ratios of the transmission. Rate limit B may also be based on gear ratio of the gearbox. Rate limit B is set to prevent exciting the driveline. Since engine torque is multiplied in the gearbox, different values can be used for rate limit B. Generally, rate limit B is the lowest in first gear and is the highest in top gear. The specific value for rate limits C and B are driveline specific and vary by gear, but example rate limits for first gear may be 250 Nm/s for rate C and 1000 Nm/s for rate B.

Figure 5:
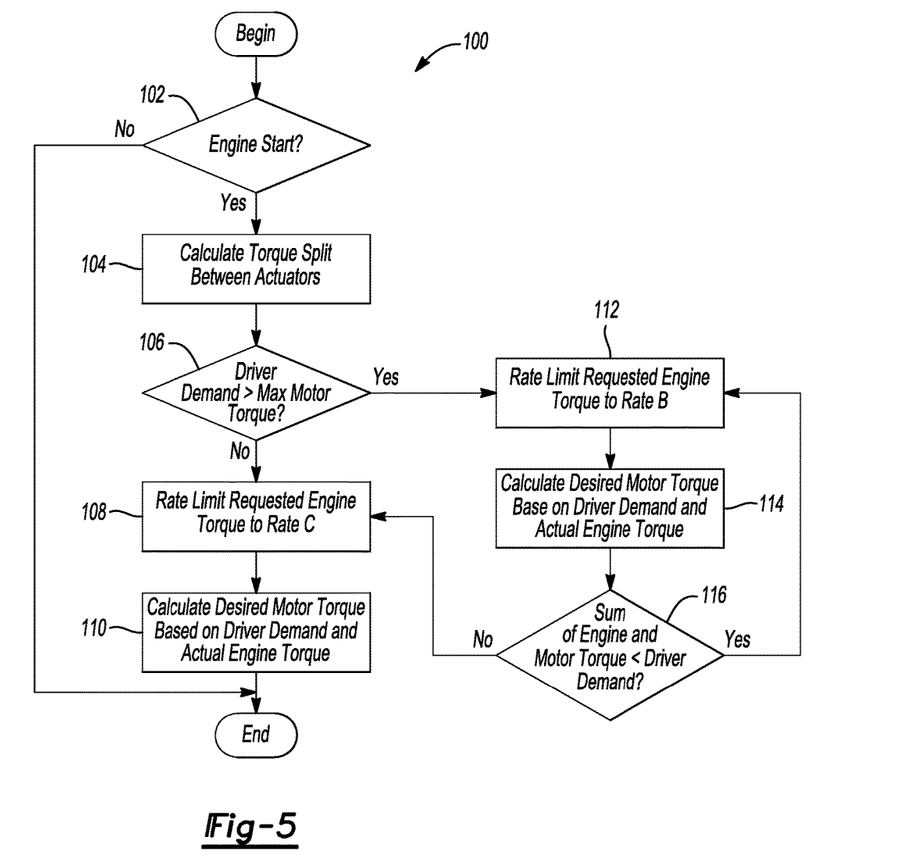
FIG. 5 is a flow chart illustrating an algorithm for apply rate limits to increases of engine torque.

Referring to FIG. 5, a flow chart 100 illustrating an algorithm for choosing between engine-torque rate limits for various engine-start scenarios is shown. At operation 102 the controller determines if an engine start is occurring. If no, control passes to other control logic. If yes, control passes to operation 104 and the controller calculates a desired torque split between the actuators, such as the motor and the engine, to produce the driver-demanded torque. At operation 106 the controller determines if the driver-demanded torque exceeds the maximum motor torque. If no, control passes to operation 108 and the requested engine torque is rate limited to a rate calibrated to prevent excessive torque spike at the transmission input shaft—such as rate C. At operation 110 the controller calculates desired motor torque based on driver-demanded torque and the actual engine torque produced.

If the driver-demanded torque is greater than the maximum motor torque during engine start control passes to operation 112. In operation 112, the requested engine torque is rate limited to a rate calibrated not to excite resonance frequencies cause other problems within the powertrain—such as rate B. The rate used in operation 112 is greater than the rate used in 108 to prevent delayed acceleration of the vehicle. At operation 114, the controller calculates the desired motor torque based on driver-demanded torque and the actual engine torque. In operation 116, the controller determines if the sum of the actual engine and motor torques is less than driver-demanded torque. If no, then the driver-demanded torque is met and control passes to operation 108 where the rate limit of the engine is reduced, e.g., from rate limit B to rate limit C. If yes at operation 116, the powertrain is still under producing torque and the rate limit is maintained at the higher limit of operation 112 until the driver-demanded torque is met, at which point, control passes to operation 108 and the rate limit is reduced.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. A vehicle comprising:
an engine and a motor selectively coupled by a clutch; and
a controller programmed to,
responsive to driver-demanded torque exceeding a maximum torque of the motor and the clutch being locked, confine rates of output torque increase of the engine to a limit having a first value, and
responsive to the driver-demanded torque being satisfied, reduce the limit to a second value.

2. The vehicle of claim 1, wherein the controller is further programmed to, in response to (i) torque of the motor decreasing and torque of the engine increasing and (ii) driver-demanded torque being less than the maximum torque of the motor, confine rates of output torque increase of the engine to the second value.

3. The vehicle of claim 1, wherein the second value is greater than zero.

4. The vehicle of claim 1, wherein the second value is based on phase delay associated with commands between the motor and the controller.

5. The vehicle of claim 1 further comprising a gearbox including multiple discrete gear ratios, and wherein the limit is based upon an engaged one of the gear ratios.

6. The vehicle of claim 5, wherein the gear ratios include a first gear ratio having a lowest speed ratio of the gearbox and a second gear ratio having a higher speed ratio than the first gear ratio, wherein the controller is further programmed to set a first magnitude of the first value responsive to the gearbox being in the first gear ratio, and set a second magnitude of the first value responsive to the gearbox being in the second gear ratio, and wherein the second magnitude is greater than the first magnitude.

7. The vehicle of claim 6, wherein controller is further programmed to set a first magnitude of the second value responsive to the gearbox being in the first gear ratio, and set a second magnitude of the second value responsive to the gearbox being in the second gear ratio.

8. The vehicle of claim 1 further comprising a gearbox and a torque converter having an impeller fixed to an output shaft of the motor and a turbine fixed to an input shaft of the gearbox.

9. The vehicle of claim 1, wherein the engine and the motor are arranged in series.

10. A vehicle comprising:
a traction battery;
an engine;
a step-ratio gearbox including multiple discrete gear ratios;
a motor coupled to the gearbox with a torque converter and electrically connected to the traction battery;
a disconnect clutch selectively coupling the engine and the motor when locked; and
a controller programmed to,
responsive to driver-demanded torque exceeding a maximum torque of the motor, start the engine and command engagement of the disconnect clutch, and
responsive to the disconnect clutch being locked, command torque of the engine such that increases in the torque are rate limited according to a first rate of change until the driver-demanded torque is achieved, and then are rate limited according to a second rate of change that is less than the first rate.

11. The vehicle of claim 10, wherein the controller is further programmed to, in response to (i) torque of the motor decreasing and torque of the engine increasing and (ii) driver-demanded torque being less than the maximum torque of the motor, command the engine torque such that increases in the engine torque are rate limited according to the second rate.

12. The vehicle of claim 10, wherein the first and second rates depend upon which of the gear ratios are engaged with the gearbox.

13. The vehicle of claim 10, wherein the gear ratios include a first gear ratio having a lowest speed ratio of the gearbox and a second gear ratio having a higher speed ratio than the first gear ratio, wherein the controller is further programmed to set a first magnitude of the second rate responsive to the gearbox being in the first gear ratio, and set a second magnitude of the second rate responsive to the gearbox being in the second gear ratio, and wherein the second magnitude is greater than the first magnitude.

14. The vehicle of claim, 10 wherein the second rate is based on phase delay associated with commands between the motor and the controller.

15. The vehicle of claim 10, wherein the disconnect clutch is arranged in series with the engine and the motor.

16. A method of rate limiting engine torque comprising:
by a controller,
responsive to a clutch being locked to fix an engine to a motor and driver-demanded torque exceeding a maximum torque of the motor, confining rates of output torque increase of the engine to a limit having a first value, and
responsive to the driver-demanded torque being satisfied, reducing the limit to a second value.

17. The method of claim 16 further comprising, responsive to (i) torque of the motor decreasing and torque of the engine increasing and (ii) driver-demanded torque being less than the maximum torque of the motor, confining rates of output torque increase of the engine to the second value.

18. The method of claim 16 wherein the limit is based on a gear ratio of a gearbox.

19. The method of claim 18, wherein the first value is smallest when the gearbox is in a first gear ratio that has a lowest speed ratio, and is largest when the gearbox is in a second gear ratio that has a highest speed ratio.

20. The method of claim 16, wherein the second value is based on phase delay associated with commands between the motor and a controller.

* * * * *